UNITED STATES PATENT OFFICE.

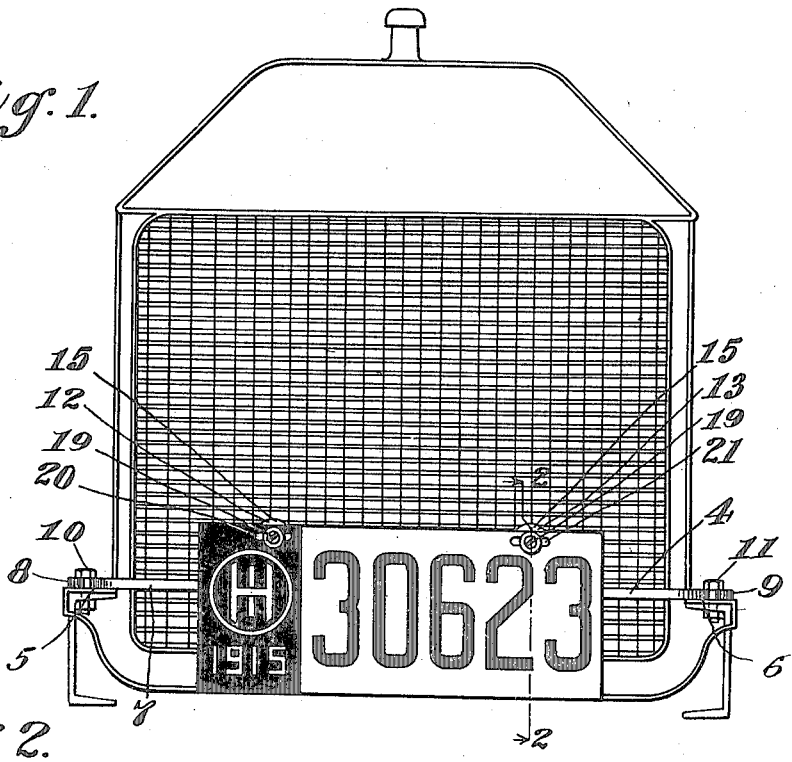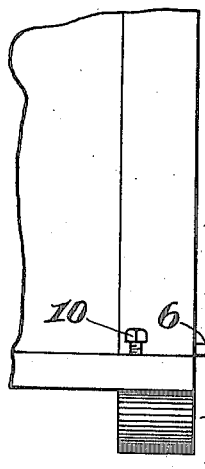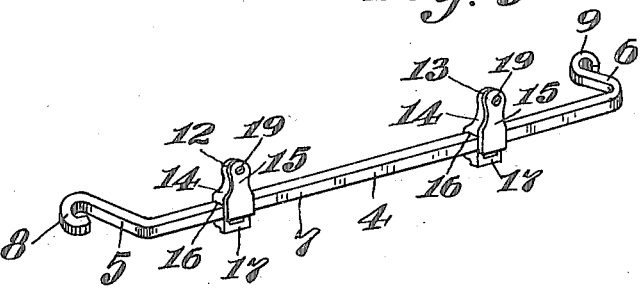

WILLIAM TOMARIN, OF CINCINNATI, OHIO.

LICENSE-TAG HOLDER FOR AUTOMOBILES.

1,207,345.          Specification of Letters Patent.          Patented Dec. 5, 1916.

Application filed May 27, 1915. Serial No. 30,710.

*To all whom it may concern:*

Be it known that I, WILLIAM TOMARIN, a citizen of the United States of America, and resident of Cincinnati, county of Hamilton, and State of Ohio, have invented certain new and useful Improvements in License-Tag Holders for Automobiles, of which the following is a specification.

This invention relates to improvements in license tag holders for automobiles, and has for an object to produce a license tag holder which will hold the license tag in a conspicuous place in front of and spaced from the radiator, so that the radiator will not become damaged or the radiating qualities thereof impaired.

A further object is to produce a license tag holder which will rigidly attach the tag to the automobile, and at the same time operate as a reinforcement for the portions to which it is attached.

These and other objects are attained in the license tag holder described in the following specification, and illustrated in the accompanying drawings, in which, Figure 1 is a front elevation of an automobile radiator having a license tag holder embodying my invention and a license tag secured thereto. Fig. 2 is a fragmental side elevation of a radiator with a tag holder and a tag secured thereto, the tag holder and tag being shown in a section taken on the line 2—2 of Fig. 1, to more fully disclose certain details of construction. Fig. 3 is a perspective view of a license tag holder embodying my invention.

In my improved license tag holder, a bar 4 extends across the radiator of the machine, for which the tag holder is designed, and is provided at its ends with portions 5 and 6, bent at an angle to the main portion 7. The ends of the portions 5 and 6 are provided with loops 8 and 9, through which the bolts 10 and 11, which secure the radiator to the side frame members of the vehicle, are adapted to be passed, in securing the tag holder to the machine.

Upon the main portion 7 of the bar 4 are slidably mounted clamps 12 and 13, for the purpose of securing a license tag in position thereon. These clamps each consist of two members 14 and 15, the back member 14 being provided with a rectangular recess 16, adapted to receive the main portion 7 of the bar 4, and the front member 15 being adapted to coöperate with the back member, to prevent displacement of the clamp. The member 14 is provided at its lower end with a loop 17, adapted to receive a hook 18, formed on the lower end of the member 15, and at the upper ends of the members registering apertures are formed, adapted to receive a bolt 19, for the purpose of holding the members together. These bolts are not only provided for the purpose of holding the members of the clamps together, but they are also provided for holding the license tag in position against the front face of the member 15 of each clamp, the bolts being passed through the slots 20 and 21 of the tag, which are provided for the purpose of suitably mounting it. By tightening the bolts, the members of the clamps will be caused to grip the bar, and the tag will also be securely attached thereto.

In securing the bar 4 in position, the washers, which are usually located beneath the heads of the bolts 10 and 11, are removed, and the looped ends 8 and 9 of the bar are substituted therefor. With the bar in position, it will be seen that the frame of the radiator is materially reinforced thereby, and that the license tag will be held away from the radiator a considerable distance, thereby preventing any obstruction to the passage of air through the radiator. In addition to this, the license tag is held adjacent to the bottom of the radiator, where the water contained therein is at its coolest temperature, instead of adjacent to its top, as when the tag is secured by a clamp secured to the radiator cap, where the temperature of the water is at its highest.

Furthermore, my improved license tag holder obviates the common practice of wiring the tag to the face of the radiator, which practice is not only objectionable, because it obstructs a portion of the radiating surface, but also for the reason that it is liable to cause the radiator to become damaged.

Another advantage of my improved license tag holder is that it does away with the practice of securing the tag to the vehicle axle by means of straps or wires, where it is in position to be covered by dust and mud, as well as to be damaged by coming in contact with the road surface, or being hit by rocks.

Instead of mounting the tag in the position shown, the clamps may be reversed to hold the tag entirely below the radiator, or the tag may be provided with slots on its bottom edge, to hold it in position to somewhat shield the radiator in cold weather, when it is desirable to keep the water warm to prevent freezing.

Having thus described my invention, what I claim is:

1. A license tag holder adapted to be secured to the mounting bolts of an automobile radiator, comprising a bar having its ends bent at an angle to the main portion thereof, and loops formed on the bent ends, said loops being adapted to be engaged by the automobile radiator mounting bolts to secure the bar transversely of and in spaced relation to the radiator, and a clamp adjustably mounted on the bar, adapted to secure a license tag thereto.

2. A license tag holder comprising a bar adapted to be mounted transversely of and in spaced relation to the radiator of an automobile, and a clamp adjustably mounted on the bar, adapted to secure a tag thereto, said clamp consisting of two members, one of said members having a recess formed therein receiving the bar, and a loop formed thereon below the recess, the other of said members consisting of a plate having a hook formed at its lower end and engaging the loop of the coöperating member, and means mounted on the upper ends of the members, adapted to clamp the members together and to secure a tag thereto.

3. A license tag holder adapted to be secured to the mounting bolts of an automobile radiator, comprising a bar having its ends bent at an angle to the main portion thereof, and loops formed on the bent ends, said loops being adapted to be engaged by the automobile radiator mounting bolts to secure the bar transversely of and in spaced relation to the radiator, and a clamp adjustably mounted on the bar, adapted to secure a license tag thereto, said clamp consisting of two members, one of said members having a recess formed therein receiving the bar, and a loop formed thereon below the recess, the other of said members consisting of a plate having a hook formed at its lower end and engaging the loop of the coöperating member, and means mounted on the upper ends of the members, adapted to clamp the members together and to secure a tag thereto.

4. A radiator reinforcement for the purpose described consisting of a transverse tie rod, arms extending therefrom to embrace the sides of the radiator, and means for securing the ends of said arms to the radiator supports.

5. A radiator reinforcement for the purpose described consisting of a transverse tie rod, integrally formed arms extending angularly therefrom to embrace the sides of the radiator, and means for securing the ends of said arms to the radiator supports.

In testimony whereof, I have hereunto subscribed my name this 25th day of May, 1915.

WILLIAM TOMARIN.

Witnesses:
WALTER F. MURRAY,
W. THORNTON BOGERT.